United States Patent Office 3,427,870
Patented Feb. 18, 1969

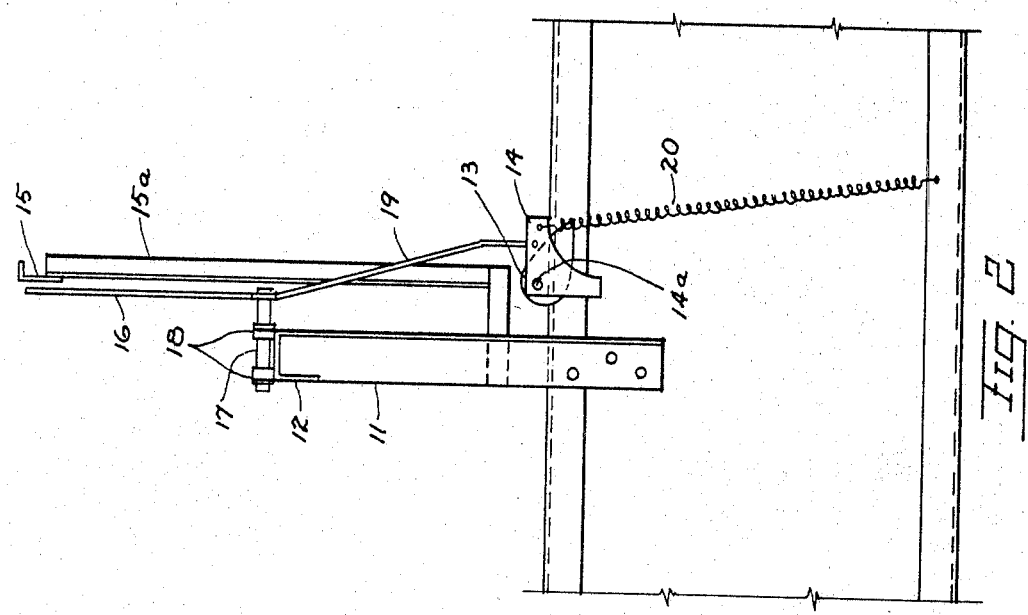
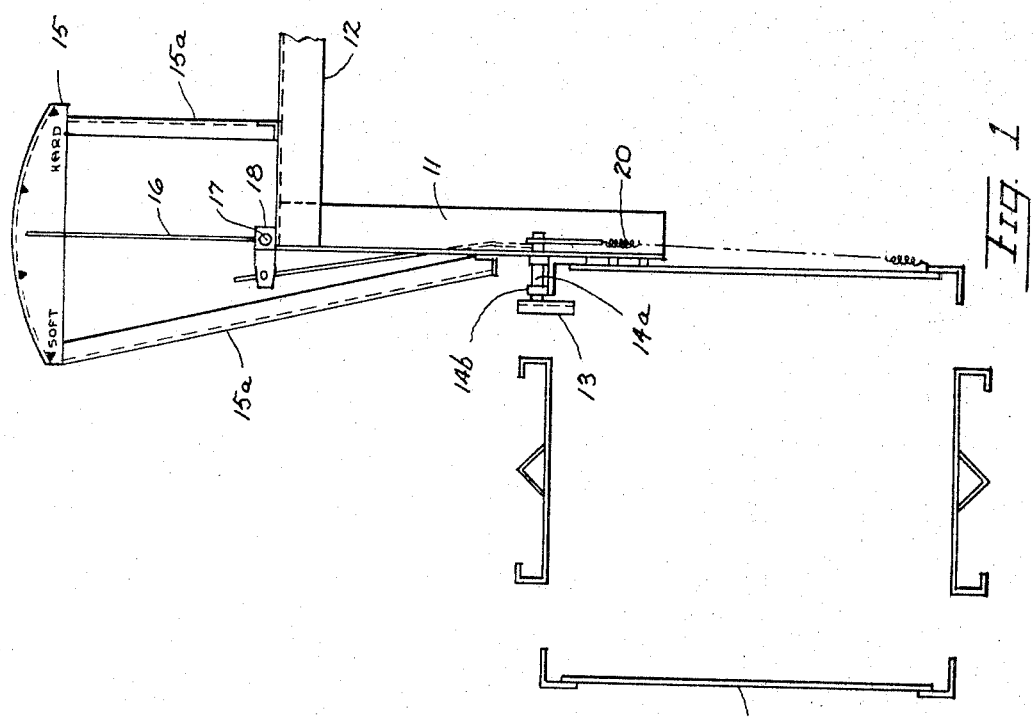

3,427,870
BALE DENSITY METER
James Arthur Merriman, Crosby, Ontario, Canada
Filed Dec. 6, 1965, Ser. No. 511,943
U.S. Cl. 73—81         3 Claims
Int. Cl. G01n *3/48*

ABSTRACT OF THE DISCLOSURE

A bale density meter comprising a cam mounted on the discharge chute of a baling machine for penetrating contact with a bale discharged through the chute, a scale having a pointer movable over the scale and means connecting the pointer and cam together so that upon rotation of the cam the pointer is moved to indicate on the scale the density of the bale.

---

This invention relates to farm implements and more particularly to a bale density meter attached to a baler.

Hay, in various conditions requires to be baled at various density, that is damp hay requires to be baled softer in order to facilitate circulation of air throughout to completely dry the hay, while dry hay can be baled harder. It is therefore important that the operator of a baling machine be aware of the density at which he is operating. In one instance it will prevent damp hay from overheating during the drying process and in the other it will result in a greater amount of hay being stored in a restricted area.

With present day baling method it is not possible to determine the degree of hardness at which hay is baled and the result is very uneven baling.

It is in order to overcome the above objections that I have devised the present invention.

Broadly the invention comprises a density meter attached to a baler so that the degree of hardness can be measured and the baler adjusted accordingly.

The meter comprises a cam which comes in contact with a bale as it goes through the ejector to actuate an indicator operating over a scale. A spring holds the cam in penetrating contact with the bale and returns the indicator to its original position when the bale has gone through the ejector.

The primary object of the invention is therefore the provision of a meter to determine the density of a bale to facilitate the adjustment of the baler by the operator.

Another important object of the invention is the provision of a such a meter to determine the hardness of a bale so that damp hay is not baled too dense to facilitate the circulation of air through the bale to dry the hay without overheating.

Another still important object is the provision of a device as set forth which permits more uniform baling.

Other apparent objects are the provision of a baling meter which is durable, efficient, which requires little if any maintenance and which is of low manufacturing cost.

With these and other objects in view that may appear as the description proceeds the invention consist in the novel arrangement of cooperating elements as hereinafter more specifically set forth, claimed and shown in the accompanying drawing forming part of this application and in which:

FIGURE 1 is a front elevational view of a baler chute with a density meter constructed in accordance with the present invention attached thereto.

FIGURE 2 is a side elevational view of FIGURE 1.

Figure 5:
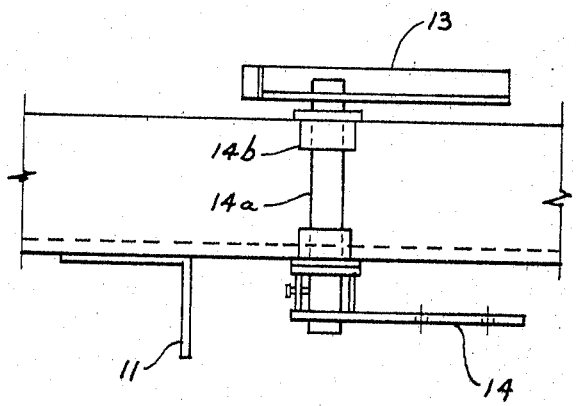
FIGURE 5 is a plan view of FIGURE 3 showing the cam and the indicator actuator.
Figures 3, 4:
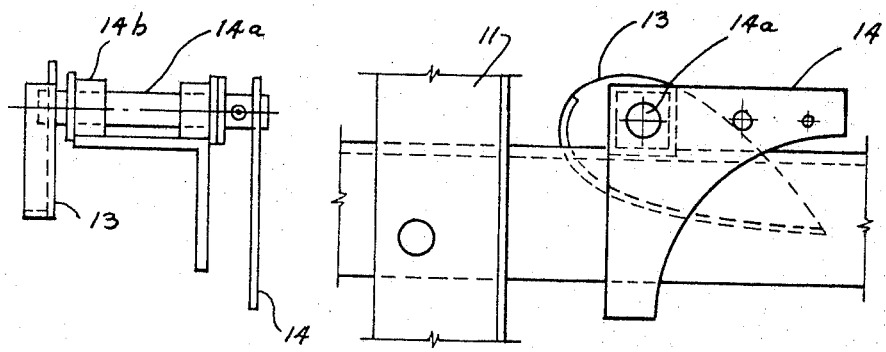
FIGURE 3 is a side elevational view of the cam arrangement which measures the density of a bale.
FIGURE 4 is an end view of the detail shown in FIGURE 3.

Referring more in detail to the drawing in which similar reference characters designate corresponding parts through the several views, it will be seen the invention comprises a baler chute 10 of conventional construction and for which no claim is made and my density meter mounted on the side thereof. The meter per se comprises a supporting frame having a vertical member 11 and a horizontal supporting member 12 attached to the upper and side members of the chute 10. Also attached to the upper horizontal member of the chute is a cam 13 and the indicator actuator member 14. Both are mounted on a common shaft 14a supported in bushings 14b.

A scale 15 for indicating the degree of hardness of a bale is supported by braces 15a which are secured, one each, to the vertical member 11 and the horizontal member 12 of the frame. As illustrated in FIGURE 1 of the accompanying drawings, the scale is graduated from soft to hard.

An indicator needle 16 is secured to a shaft 17 which rotates in a pair of bushings 18 said bushings and shaft being mounted on the horizontal member 12 of the frame directly below the scale 15. A link 19 has one end connected to a lateral arm extending from the needle 16 and its opposite end to the actuator member 14.

A spring 20 has one end connected to the actuator member 14 and its opposite end to the side member of the chute.

In operation when a bale of hay goes through the chute 10 the cam 13 comes in contact with and penetrates the bale depending upon the degree of hardness of said bale, the cam penetrates accordingly. The cam depending on the density of the bale is raised upwardly thus rotating the needle actuator 14 which moves the link 19 upwardly. Since the link is connected to the shaft 17 on which the needle 16 is mounted, the needle is actuated to indicate on the scale 15 the degree of hardness of the bale. When the bale has gone through the chute the spring 20 attached at one end to the needle actuator and at its other end to the frame of the chute, returns the needle to its original position.

Since the degree of hardness of the bale has been determined by the indicator it is an easy matter to adjust the baler to the desired hardness.

It is believed that the construction and advantages have been fully set forth and that further detailed description is not required.

While the preferred embodiment of the invention has been disclosed, it is to be understood that minor modifications may be resorted to without departing from the spirit of the invention and the scope of claims.

The embodiments of the invention in which an exclusive property or privilege is claimed are defined as follows.

I claim:

1. A density meter for baling machines having a discharge chute comprising a cam rotatably mounted on the discharge chute in the path of movement of the bale through said chute, a density indicating means mounted on said chute, an actuator member operated by said cam for actuating said indicating means, and means for holding said cam in penetrating contact with the bale as it is discharged through said chute.

2. A density meter for baling machines as described in claim 1 including a link connecting said actuator member with said indicating means for operating the indicator means upon rotation of said cam.

3. A density meter for baling machines as described in claim 1 wherein said actuator member is connected to rotate with said cam and said last mentioned means is a coil spring having one end connected to said chute and its opposite end to said actuator member so that the cam is rotated into penetrating contact with the bale.

References Cited

UNITED STATES PATENTS

| | | | |
|---|---|---|---|
| 2,579,444 | 12/1951 | Taylor | 73—141 |
| 2,712,233 | 7/1955 | Raynor | 73—141 |
| 1,037,596 | 9/1912 | Coppage | 73—81 |
| 2,421,449 | 5/1942 | Zuber | 73—81 |

RICHARD C. QUEISSER, *Primary Examiner.*

H. GOLDSTEIN, *Assistant Examiner.*